United States Patent
Jurek et al.

(10) Patent No.: US 11,306,216 B2
(45) Date of Patent: Apr. 19, 2022

(54) HIGH MOLECULAR WEIGHT POLYSTYRENE IN INKS AND COATINGS

(71) Applicant: SUN CHEMICAL CORPORATION, Parsippany, NJ (US)

(72) Inventors: Michael J. Jurek, Oak Ridge, NJ (US); John G. Tiessen, Elk Grove Village, IL (US); Soichiro Omizu, Aomori (JP); Juanita M. Parris, Montvale, NJ (US)

(73) Assignee: Sun Chemical Corporation, Parsippany, NJ (US)

(*) Notice: Subject to any disclaimer, the term of this patent is extended or adjusted under 35 U.S.C. 154(b) by 22 days.

(21) Appl. No.: 16/906,374

(22) Filed: Jun. 19, 2020

(65) Prior Publication Data

US 2020/0317939 A1    Oct. 8, 2020

Related U.S. Application Data

(63) Continuation-in-part of application No. 16/076,399, filed as application No. PCT/US2017/016939 on Feb. 8, 2017, now Pat. No. 10,689,500.

(60) Provisional application No. 62/292,906, filed on Feb. 9, 2016.

(51) Int. Cl.
| C09D 7/20 | (2018.01) |
| C09D 11/101 | (2014.01) |
| C09D 11/108 | (2014.01) |
| C09D 125/06 | (2006.01) |
| C09D 4/06 | (2006.01) |
| C09D 11/033 | (2014.01) |

(52) U.S. Cl.
CPC .............. *C09D 11/101* (2013.01); *C09D 4/06* (2013.01); *C09D 7/20* (2018.01); *C09D 11/033* (2013.01); *C09D 11/108* (2013.01); *C09D 125/06* (2013.01)

(58) Field of Classification Search
USPC .................................................... 521/46, 47
See application file for complete search history.

(56) References Cited

U.S. PATENT DOCUMENTS

| 2,549,538 A | 4/1951 | Sparks et al. |
| 3,143,536 A | 8/1964 | Giuseppe et al. |
| 3,424,822 A | 1/1969 | Liston |
| 3,842,059 A | 10/1974 | Milkovich et al. |
| 4,007,311 A | 2/1977 | Harlan, Jr. |
| 5,502,263 A | 3/1996 | Ponsford et al. |
| 5,672,794 A | 9/1997 | Northemann |
| 2003/0003554 A1 | 1/2003 | Miller |
| 2005/0038137 A1 | 2/2005 | Yoshihara et al. |
| 2014/0004267 A1 | 1/2014 | Van Den Hugues et al. |
| 2015/0210611 A1 | 7/2015 | Tippet et al. |
| 2019/0389236 A1* | 12/2019 | Tiessen .................. B41J 11/002 |

FOREIGN PATENT DOCUMENTS

| CN | 101 704 932 A | 5/2010 |
| CN | 104693857 | 6/2015 |
| CN | 104693908 | 6/2015 |
| JP | 2003002914 | 1/2003 |
| JP | 2003-183592 A | 7/2003 |
| JP | 2007-521345 A | 8/2007 |
| JP | 2011-215393 | 10/2011 |
| KR | 10-2011-0130142 | 12/2011 |
| KR | 10-2013-0120203 A | 11/2013 |
| WO | WO 2015/164331 | 10/2015 |

OTHER PUBLICATIONS

International Search Report issued in International Application No. PCT/US17/16939, dated Apr. 14, 2017.
Written Opinion of the International Searching Authority issued in International Application No. PCT/US17/16939, dated Apr. 14, 2017.
Supplemental European Search Report issued in International Application No. 177506672.2, dated Sep. 6, 2019.
Office Action issued in counterpart Japanese Application No. 2018-538741 dated Mar. 22, 2021 and English language translation thereof.
Office Action issued in counterpart CN Application No. 201780007037.9 dated Feb. 6, 2020 and English language translation thereof.
Office Action issued in counterpart CN Application No. 201780007037.9 dated Sep. 29, 2020 and English language translation thereof.
Office Action issued in counterpart Indian Application No. 201817028404 dated Jul. 14, 2020 and English language translation thereof.
Office Action issued in counterpart Japanese Application No. 2018-538741 dated Sep. 2, 2020 and English language translation thereof.
Office Action issued in counterpart Chinese Application No. 202110635641.1 dated Nov. 2, 2021 and English language summary thereof.

* cited by examiner

*Primary Examiner* — Terressa Boykin
(74) *Attorney, Agent, or Firm* — Marian E. Fundytus; Ostrolenk Faber LLP.

(57) ABSTRACT

Described herein are depolymerized polystyrene resins derived from polystyrene source resins. The depolymerized polystyrene resins undergo a depolymerization in which chemical bonds are cleaved, producing depolymerized polystyrene resins of lower molecular weight. The polystyrene resins may be modified by chemical reaction with monomers, polymers, and oligomers, such as acrylates thereof. Also described are ink and coating compositions that include the depolymerized and modified polystyrene resins.

21 Claims, No Drawings

HIGH MOLECULAR WEIGHT POLYSTYRENE IN INKS AND COATINGS

The present application is a continuation-in-part application of U.S. application Ser. No. 16/076,399 filed Aug. 8, 2018, which is a § 371 National Phase application based on PCT/US2017/016939 filed Feb. 8, 2017, which claims the benefit of U.S. Provisional Application No. 62/292,906, filed Feb. 9, 2016, the subject matter of each of which is incorporated herein by reference in their entirety.

FIELD OF THE INVENTION

The present disclosure is directed to polystyrene resins obtained by depolymerizing a source polystyrene resin. Depolymerization may occur through the action of free radical initiators, catalysts, exposure to radiation, and other means. The depolymerized polystyrene may be reacted with another component such as a monomer, oligomer, and polymer. The present disclosure is also directed to processes for producing depolymerized and/or modified polystyrene resins, and it is further directed to ink and coating compositions that include same. The compatibility and stability of ink or coating compositions including the depolymerized and/or modified polystyrene resin is similar to commercially available ink and coating compositions. The depolymerized and/or modified polystyrene resins may also be used as a component in other compositions such as adhesives. The source polystyrene resin may be, for example, a virgin polystyrene resin, a scrap polystyrene resin, a recycled polystyrene resin and/or a reclaimed polystyrene resin.

BACKGROUND OF THE INVENTION

Reducing the amount of plastic materials disposed of in landfills is an important environmental consideration. One approach has been to use post-consumer and post-industrial recycled plastic materials in newly produced plastic products. With certain plastic materials this is relatively straightforward. However, the recycling of polystyrene is challenging. Polystyrene is a widely used thermoplastic having a hardness, hydrophobic nature, and chemical composition that renders it essentially non-degradable under normal conditions. The foamed version of polystyrene, often referred to as Styrofoam®, poses a particularly serious problem to marine life and natural ecosystems due to it buoyancy, stability, and durability. Among the environmental problems it causes is that it often turns up as floating debris that is consumed by marine life.

Since polystyrene packaging products do not degrade under normal conditions, polystyrene presents substantial problems as a waste material. Recycling could lead to an alleviation of environmental concerns. Developing a way to utilize post-consumer and post-industrial recycled polystyrene would produce tangible benefits.

US 2014/004267 is directed to a radiation curable composition incorporating an inert resin described as a polystyrene resin with a number average molecular weight of between 100 and 5000 Daltons.

U.S. Pat. No. 4,007,311 is directed to an adhesive made from grafting acrylate monomers onto block copolymers of polystyrene-polybutadiene-polystyrene and polystyrene-polyisoprene-polystyrene. The molecular weight of same are between about 25,000 and 250,000 Daltons, preferably between about 50,000 and 150,000 Daltons.

JP 2003002914 is directed to overprint varnish emulsions containing styrene polymers having a molecular weight between 1500 and 2900 Daltons. The polymers are formulated from cross-linkable monomers and/or cross-linkable oligomers and photo-initiators.

SUMMARY OF THE INVENTION

The present disclosure describes a depolymerized polystyrene resin having a number average molecular weight greater than 5,000 Daltons that derives from a source polystyrene resin. The depolymerized polystyrene may derive from a polystyrene source resin having a number average molecular weight (Mn) of, for example 40,000 Daltons or more, in which, for example, C—C bonds are cleaved to produce the depolymerized polystyrene of reduced molecular weight.

In another aspect, the present disclosure describes an inventive process for preparing a depolymerized polystyrene resin having a number average molecular weight of greater than 5,000 Daltons comprising (a) introducing radical sites on a polystyrene source resin of a relatively high molecular weight by cleaving bonds in the polystyrene source resin to produce a relatively lower molecular weight depolymerized polystyrene resin. In a further inventive process aspect, the depolymerized polystyrene resin of (a) is (b) reacted with monomers or oligomers having polar and/or polar charged groups at radical sites of the depolymerized polystyrene resin. In a further inventive process aspect, the depolymerized polystyrene resin of (a) is (c), reacted with polymers having polar functional groups to introduce functionality thereto.

When heating, for example, a polystyrene source resin provided by a recycled polystyrene material and a (c) component, such as polyacrylate polymer, in, for example, an ink oil, the materials are not soluble and/or miscible. However, Applicant has found that when a free radical initiator is added to the above system and reaction conditions are attained, a polymerization reaction occurs that produces a stable, uniform copolymer solution/dispersion. Thus, copolymer systems can be produced.

Further, for example, when a source polystyrene resin is depolymerized in (a) to produce reactive sites generated on the polystyrene polymer, such sites can be reacted with functional groups supplied by, for example, unsaturated monomers to produce a grafted copolymer structure. The same can take place with (c), where copolymers of polystyrene or polyacrylate polymers or combination thereof may be placed in solution with the source polystyrene resin. The addition of free radical initiators and attaining of reaction conditions can generate radicals on the polymer chains. In another possible outcome where reactive species provided by monomers, oligomers, or polymers of (b) and (c) are not present, the reactive sites on polymer chains may recombine, leading to copolymer formation via macromolecule combination.

Reactions with other functional groups as described in (b) and (c) above, which may be functional groups of monomers, oligomers, and polymers, produce modified polystyrene resins from the depolymerized styrene resins. The depolymerized and/or modified polystyrene resins described herein exhibit improved compatibility and stability in an ink or coating composition, when compared to polystyrene resins of high molecular weight. For example, a depolymerized polystyrene resin in accordance with the present disclosure has been shown to have good stability in an ink and coating composition. Further, a modified polystyrene resin, such as the depolymerized polystyrene resin of (b) and/or (c), also exhibits improved compatibility and stability in an ink or coating composition.

Radical sites may be introduced into a source polystyrene resin by exposing the source resin to the bond cleaving action of an initiator, catalyst, ionizing radiation, plasma source, and other means. The ionizing radiation may be introduced by way of electron beam. The plasma may be produced by corona discharge.

In modifying the depolymerized polystyrene resin, the polar and/or polar charged functional groups used to modify may derive from, for example, monomers, oligomers, and polymers. Such monomers, oligomers and polymers may be for example, a (meth) acrylate, styrene, (meth)acrylic acid, esters of (meth)acrylic acid, polymers, copolymers thereof, terpolymers thereof, and combinations thereof. The styrene monomers, oligomers and or polymers used to modify the depolymerized polystyrene structure may differ from the source polystyrene resin in accordance with one or more characteristics, thus providing a modified polystyrene resin of different quality or qualities than the original source resin. For example, the modifying material, such as a different polystyrene resin material, may differ from the source polystyrene material in terms of the degree of branching that it possesses, or in the lengths of the branched chains.

The depolymerized and/or modified polystyrene resins described herein possess physical properties that make them suited for use in ink and coating compositions. For example the depolymerized and/or modified polystyrene resins may be used as binders in such compositions. The properties of the depolymerized and/or modified polystyrene resins are substantially similar to the properties of binders presently used in such compositions.

The depolymerized polystyrene resins of the present description may derive from polystyrene source materials that include up to 100 percent post-consumer and/or post-industrial recycled polystyrene. Recycling of waste or scrap polystyrene, either post-consumer or non-post-consumer, is a worldwide concern due to the impact on the environment caused by this material and the increasing volume in which it is produced.

In one aspect, the source polystyrene resin may come from a polystyrene molded article considered to be post-consumer scrap. In another aspect, the source polystyrene resin may derive from a foamed polystyrene resin. The source polystyrene resin may be selected from one or more of expanded polystyrene (EPS), which is made from expandable polystyrene containing an expansion agent; general purpose polystyrene (GPPS), high impact polystyrene (HIPS), a polystyrene that is modified with rubber, such as styrene butadiene rubber; ABS, which is acrylonitrile-butadiene-styrene, and extruded polystyrene foam (XPS). These polystyrenes may be derived from waste material generated in the production of the particular kind of polystyrene used as a source and/or the production of polystyrene molded articles or is secured from industrial source having number average molecular weight of 40,000 Daltons or more.

In one aspect, the depolymerized and/or modified polystyrenes of relatively lower molecular weight are obtained by depolymerizing a polystyrene source resin material that, for example, may be virgin, scrap, recycled, or reclaimed polystyrene source resin material. Depolymerization may occur through the action of initiators or catalysts in a solution or melt of polystyrene. Depolymerization may occur by irradiating the polystyrene source material, such as with radiation from an electron beam source, or by exposing a polystyrene source resin to a plasma-generating source. In any event, the resulting depolymerized and/or modified material can improve the compatibility and stability of resulting lower molecular weight polystyrene in ink and coating compositions.

The degree of depolymerization can be controlled, such as by controlling the temperature of the depolymerization process and the amounts of the depolymerizing agents used, e.g., the amounts of the initiators and catalysts. Where depolymerization occurs by exposing the polystyrene source resin to radiation and plasma, the conditions of these processes can be managed to control the depolymerization. Also, pressure under which depolymerization occurs may be used to control the depolymerization.

In one aspect, process steps (a) and (b) may be combined into a single step and thus the present invention further provides a process for preparing a modified polystyrene resin having a number average molecular weight (Mn) of at least 5,000 Daltons comprising (a) introducing radical sites on polystyrene with a catalyst, initiator or with ionizing radiation in the presence of polar and/or polar charged functional groups (b) optionally, further reacting the polar functional polystyrene to enhance compatibility or to introduce functionality that can be further reacted with another component.

In one aspect, the depolymerized polystyrene resin is modified with reactive monomers, oligomers, and polymers that react with the radicals introduced by the action of the catalyst, the initiator, and/or other depolymerizing means. Such monomers may include etc., for example, (meth) acrylic acid, (meth) acrylates and styrene.

The Mn for the depolymerized and/or modified polystyrene resins of the present disclosure is greater than 5,000 Daltons. The Mn for the depolymerized and/or modified polystyrene resins of the present disclosure may, in another aspect, be greater than about 10,000 Daltons; in yet another aspect, be greater than about 15,000 Daltons; in still another aspect, be greater than about 20,000 Daltons; in yet still another aspect, be greater than about 25,000 Daltons; in yet still another further aspect, be greater than about 30,000 Daltons; in yet even another aspect, be greater than about 35,000 Daltons; in yet even still another aspect, be greater than about 40,000 Daltons; in yet even still another further aspect, be greater than about 45,000 Daltons; in even further, in another aspect, be greater than about 50,000 Daltons. These Mn values encompass depolymerized polystyrene resins and depolymerized polystyrene resins that have been modified.

These and other objects, advantages, and features of the invention will become apparent to those persons skilled in the art upon reading the details of the methods and formulations as more fully described below.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth)acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, the terms "monomer" or "monomers" is intended to include both monomers and oligomers, or mixtures thereof.

As used herein, the terms "(meth)acrylic resin," "acrylic polymer," and "acrylic resin" are used interchangeably. These terms encompass acrylic and methacrylic polymers, copolymers, and resins.

As used herein, the terms "polymer" and "polymers" includes copolymers unless indicated otherwise.

As used herein, the terms "inks and coatings," "inks," "compositions" and "fluids" are used interchangeably.

Throughout this disclosure, all parts and percentages are by weight (wt % or mass % based on the total weight) and all temperatures are in ° C. unless otherwise indicated.

The present disclosure describes a depolymerized and/or modified polystyrene resin having a number average molecular weight (Mn) greater than 5,000 Daltons, processes for making same, and ink and coating compositions containing same.

The process comprises (a) introducing radical sites on a polystyrene source resin of a relatively high molecular weight by cleaving bonds in the polystyrene source resin to produce a relatively lower molecular weight depolymerized polystyrene resin. In a further inventive process aspect, the depolymerized polystyrene resin of (a) is (b) reacted with polar and/or polar charged groups supplied by monomers or oligomers at radical sites of the depolymerized polystyrene resin. In a further inventive process aspect, the depolymerized polystyrene resin of (a) is (c), reacted with the polar functional groups supplied by polymers to introduce functionality thereto. The depolymerization of the polystyrene may include depolymerization by exposure to catalyst, to initiator or to ionizing radiation of a source polystyrene resin while in the presence of a second component (b) and/or (c), with a chemical reaction occurring between the radicalized/depolymerized polystyrene resin and the second component forming a modified polystyrene resin. The second component (b) and/or (c) may be a monomer, oligomer, or polymer or combinations thereof.

In providing a depolymerized polystyrene resin, the C—C bonds of a source polystyrene resin material may be cleaved by the actions of an initiator, a catalyst, irradiation, plasma etc. The resulting depolymerized polystyrene resin may be modified at the radical sites formed where bonds have been cleaved to bond polar and/or polar charged functional groups to the depolymerized polystyrene material.

The depolymerized and/or modified polystyrene resins can be included in ink and coating compositions. For example, they can be used as binders in such compositions. The modified polystyrene resins possess physical properties that are substantially similar to those of binders used in state of the art ink and coating compositions. The depolymerized and/or modified polystyrene resins described herein may derive from up to 100 percent post-consumer and/or post-industrial recycled polystyrene, including high impact polystyrene which contains nominal amounts of styrene butadiene rubber (SBR) in the polystyrene backbone. Recycling of waste polystyrene, either post-consumer or non-post-consumer, is a worldwide concern due to its environmental impact and the increasing volume of these materials being produced by society.

While in one aspect, the polystyrene may be derived from polymerizing styrene monomer (virgin polystyrene), it preferably derives from waste or scrap material generated in the polystyrene production process and waste materials generated in the production of polystyrene (pre-consumer scrap). Advantageously, the polystyrene is derived from polystyrene molded articles (post-consumer scrap). The polystyrene may be expanded polystyrene (EPS) which is made from expandable polystyrene containing an expansion agent. The polystyrene may be general purpose polystyrene (GPPS) or high impact polystyrene (HIPS) which is modified with rubber. The polystyrene could be ABS which is acrylonitrile, butadiene, and styrene. The polystyrene could be foam polystyrene; one example of same being extruded polystyrene foam (XPS). The polystyrene could be expanded polystyrene (EPS).

The source polystyrene resin has a number average molecular weight greater than about 40,000 Daltons. More preferably, the source polystyrene resin has a molecular weight greater than about 50,000 Daltons; still more preferably, the source polystyrene resin has a molecular weight greater than about 75,000 Daltons; yet still more preferably, the source polystyrene resin has a molecular weight greater than about 100,000 Daltons; and even still more preferably, the source polystyrene resin has a molecular weight greater than about 120,000 Daltons.

The depolymerization of a source polystyrene resin, the cleavage of C—C bonds, and the introduction of radicals at the cleavage sites may be is achieved by introducing an initiator to the polystyrene source resin under depolymerization, e.g., bond cleaving, conditions. For example, the source polystyrene resin may be dissolved in a suitable solvent in the presence of an initiator, or a melt of the source resin can be produced in the presence of an initiator. In either case, the temperature of the solution or melt may be raised and maintained to about 170° C. or greater, preferably to about 180° C. or greater, and more preferably to about 190° C. or greater. Under these conditions, an initiator present in the melt or solution will depolymerize the polystyrene source resin, such as by cleaving chemical bonds. The bonds may be cleaved homolytically, creating depolymerizing portions from the source polystyrene resin. Through control of temperature, the amount of initiator and catalyst used, and pressure under which the process takes place, the degree of depolymerization of the source polystyrene resin may be controlled.

Upon the depolymerization, the polystyrene resin may have terminal ends that are vinylic, saturated, and/or or oxy substituted.

Where the depolymerized polystyrene resins are to be modified by reaction with monomers, oligomers, or polymers, the modification reaction may take place step-wise, e.g., with the monomers, oligomers, or polymers being added to the reaction vessel after depolymerization has taken place. Alternatively, depolymerization may take place in one step. For example, introducing the source polystyrene resin, an initiator (for example), solvents, and monomers, oligomers, or polymers to the vessel, and then raising the temperature to initiate depolymerization and modification reactions can take place in one step.

Suitable initiators include, for example, organic peroxides such as peroxides including alkyl and aryl hydroperoxides, persulfates, perborates, percarbonates, azo compounds, etc. The azo compounds which are suitable initiators include both the conventional azo compounds such as azobis (isobutyronitrile), 2,2'-azo bis-(2-methylbutyronitrile), etc., and azo compounds which are not nitrile groups. Commercially available initiator materials include those available under the Luperox® trade name. Luperox® is a trade name for a group of organic alkyl or aryl peroxides, hydro-peroxides and percarbonates.

It is also possible to conduct the depolymerization and/or modification reactions (e.g., the reactions of (b) and (c)) under the action of catalysts, in which a catalyst is introduced to a source polystyrene resin and/or the monomers, oligomers and polymers of (b) and (c) under reaction conditions (the same or similar to those free radical initiator reaction conditions).

In another aspect irradiation of the polystyrene can be employed to create radicals in the polystyrene, such as irradiation with an electron beam source. Electron beam scission (e.g., cleavage) occurs when the formed radicals fail to recombine with each other and react with oxygen and/or undergo hydrogen abstraction to form terminal groups. The net result of electron beam scissioning of a polymer is a reduction in polymer molecular weight and the introduction of oxygen groups. Exposing a source polystyrene resin to radiation, such as from an electron beam radiation source, is another way to effect the depolymerization of a source polystyrene resin. In one aspect, the electron beam energy should be about 8 MeV.

In yet another aspect, the polystyrene is exposed to plasma, such as plasma generated by a corona discharge plasma source. During exposure to the plasma, oxygen is incorporated into the polystyrene structure through insertion or chain degradation, e.g., chemical bond cleavage, which forms functional groups that can be reacted with other components such as monomers, oligomers, and acrylates in a further reaction.

The depolymerization reaction, in which bond cleavage results in a molecular weight reduction can be the sole modification of the polystyrene source resin, or it may be followed by a modification in which the depolymerized polystyrene resin is further substituted with polar and/or polar charged functional groups. Such groups may be provided by monomers, oligomers, and polymers, such as acrylate monomers, oligomers, and polymers. Reactions between the radical sites of the depolymerized polystyrene resins and the functional groups of such by monomers, oligomers, and polymers create polymer structures that exhibit relatively low molecular weights, e.g., number average molecular weights of greater than 5,000 Daltons. In another aspect, greater than about 10,000 Daltons; in yet another aspect, the number average molecular weight may be greater than about 15,000 Daltons; in still another aspect, the number average molecular weight may be greater than about 20,000 Daltons; in yet still another aspect, the number average molecular weight may be greater than about 25,000 Daltons; in yet still another further aspect, the number average molecular weight may be greater than about 30,000 Daltons; in yet even another aspect, the number average molecular weight may be greater than about 35,000 Daltons; in yet even still another aspect, the number average molecular weight may be greater than about 40,000 Daltons; in yet even still another further aspect, the number average molecular weight may be greater than about 45,000 Daltons; in even further, in another aspect, the number average molecular weight may be greater than about 50,000 Daltons.

In one aspect of the present disclosure, the polymerizable monomers, oligomers and polymers that can react with the depolymerized polystyrene include acrylic monomers and methacrylic monomers having only one (co)polymerizable double bond in the molecule. Such acrylic monomers and methacrylic monomers include those having a functional group capable of undergoing a cross-linking reaction, such as a hydroxyl group or a carboxyl group, and those acrylic monomers or methacrylic monomers having no such functional group.

Examples of (meth)acrylic monomers suitable for use include (meth)acrylic acid alkyl esters such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, and dodecyl (meth)acrylate; (meth)acrylic acid esters such as cyclohexyl (meth)acrylate, benzyl (meth)acrylate, phenyl ethyl (meth)acrylate, phenoxyethyl (meth)acrylate, and phenoxydiethylene glycol ester (meth)acrylate; and (meth)acrylic acid aryl esters such as phenyl (meth)acrylate, and methyl phenyl (meth)acrylate. These monomers can be used alone, or two or more of them may be used in combination. Preferably, acrylic acid alkyl esters are used and, particularly preferably, n-butyl acrylate or acrylic acid or lauryl methacrylate or n-butyl methacrylate are used.

The ink and coating compositions may also contain one or more colorants in the form of a dye or pigment dispersed therein. Suitable pigments include conventional organic or inorganic pigments. Representative pigments may, for example, be selected from the group of Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48: 2, Pigment Red 53: 1, Pigment Red 57: 1, Pigment Red 81: 1, Pigment Red 112, Pigment Red 122, Pigment Red 170, Pigment Red 184, Pigment Red 210, Pigment Red 238, Pigment Red 266, Pigment Blue 15, Pigment Blue 15: 1, Pigment Blue 15: 2, Pigment Blue 15: 3, Pigment Blue 15: 4, Pigment Blue 61, Pigment Green 7, Pigment Green 36, Pigment Violet 1, Pigment Violet 19, Pigment Violet 23, and Pigment Black 7.

Dyes suitable for use as colorant include, but are not limited to, azo dyes, anthraquinone dyes, xanthene dyes, azine dyes, and combinations thereof. Other organic and inorganic pigments and dyes can also be employed, as well as combinations that achieve the colors desired.

The primers, inks, or coating compositions may be any known color, e.g., black, white, red, orange, yellow, green, blue, indigo, violet and all shades and combinations in between.

Ink and coating compositions as described herein may contain depolymerized and/or modified polystyrene resin between about 1 to about 90 wt % of said resin; preferably about 2 to about 60 wt % of said resin; more preferably about 5 to about 50 wt % of said resin; and even more preferably about 10 to about 40 wt % of said resin. These amounts are based on the total weight of the ink and coating compositions.

The ink and coating compositions can be cured to render dry films by methods including, for example, solvent evaporation as occurs in, aerial oxidation, and actinic-radiation employing methods, such as by curing with an actinic light source, such as for example electron beam energy, UV-light that may be provided by a high-voltage mercury bulb, a medium-voltage mercury bulb, a xenon bulb, a carbon arc lamp, a metal halide bulb, a UV-LED lamp, a UV laser, such as a semiconductor laser or an excimer laser, or sunlight. The curing occurs primarily through unsaturated groups via added mono-, di-, tri- or higher-functionality referred to as energy cure monomers.

In one embodiment, the depolymerized styrene may be used as the primary or secondary resin in the formulation of solvent-based inks. Examples of solvent-based inks can be found in Table 6 below (Ink Examples 2 & 3). These specific examples are for heat-set inks but the depolymerized styrene could be used in virtually any solvent-based ink system where styrene is suitable. Examples include, flexographic, gravure, screen, lithography, heatset, and sheetfed, etc.

There is no specific limitation on the solvents that could be used in the formulation of solvent-based inks incorporating the depolymerized styrene of the present invention. Examples of suitable solvents include a fast solvent, an intermediate solvent, a slow solvent or their mixtures. In low viscosity print applications, such as flexographic or gravure, fast drying solvents can be selected from the group consisting of methanol, ethanol, propanol, iso-propanol, acetone, methyl ethyl ketone, methyl isobutyl ketone, pentane, hexane, heptane, methyl acetate, ethyl acetate, propyl acetate, derivatives of the included solvents, and their mixtures. In some examples, the intermediate solvent can be selected from the group consisting of C4-8 alcohols, 1-methoxy-2-propanol, 2-methoxy ethanol, 2-ethoxy ethanol, 1-methoxy-2-acetoxy propane, derivatives of the included solvents, and their mixtures. The slow solvent can be selected from the group consisting of tripropylene glycol monomethyl ether, tripropylene glycol-n-butyl ether, propylene glycol phenyl ether, derivatives of the included solvents, and their mixtures. In high viscosity print applications, such as offset or screen, solvents can be selected higher boiling solvents such a petroleum distillates, hydrocarbons and fatty acid methyl esters. Other broad classes of suitable solvents include aliphatic hydrocarbons, cyclic hydrocarbons, aromatic hydrocarbons, ketones, aldehydes, alcohols, ethers, esters, and mixtures thereof.

There is no specific limitation on the additional resins that could be incorporated into the solvent-based inks that contain the depolymerized styrene of the present invention. Examples include alkyds, phenolics, nitrocellulose, polyamides, vinyls, acrylics, rosin esters, hydrocarbons, polyurethane, epoxies, polyesters, styrenes, urea, melamin-formaldehydes, etc.

Examples of solvent-based inks that dry by oxidation generally applies to high viscosity offset inks such as sheet-fed inks and to a lesser extent heatset inks. In these inks systems, inks are dried by oxidative polymerization of the resins and by means of absorption and/or penetration of solvents/diluents into the paper substrate. Examples include linseed oil, tung oil or castor oil, dehydrated castor oil, fatty acid esters as well as petroleum distillates and mineral oils. Examples of such fatty acid esters include the methyl, ethyl, butyl and 2-ethylhexyl esters of tall oil fatty acids, coconut fatty acids, linseed oil fatty acids, soya oil fatty acids, palm oil fatty acids and rapeseed oil fatty acids; diethylene glycol esters of tall oil fatty acid; methyl esters of lauric acid, myristic acid, palmitic acid and caprylic acid; methyl, butyl, 2-ethylhexyl and isobutyl esters of oleic acid; oleic acid esters of diethylene and triethylene glycol; and dibutyl and di-2-ethylhexyl adipates and sebacates, Other possible solvents include almond oil, cacao oil, candlenut oil, corn oil, cottonseed oil, grape seed oil, hempseed oil, olive oil, peanut oil, rice bran oil, safflower oil, sunflower oil, sesame oil, soybean oil, and walnut oil, including fatty acid esters thereof, fatty acid alkyl esters thereof, and combinations thereof. Exemplary vegetable oils include, for example, ethyl hexyl palmitate. Suitable hydrocarbon solvents include paraffinic oils, such as white mineral oils (CAS No. 8042-47-5), e.g., Magie N-40 oil; naphthenic oils and distillates, such as hydrotreated light naphthenic distillates (CAS No. 64742-53-6), e.g., Nytex 5130, and hydrotreated heavy naphthenic distillates (CAS No. 64742-52-5), e.g., Nytex 510 and Nytex 810); and aromatic oils. The hydrocarbon solvent optionally can be a process oil containing bitumen (CAS No. 64742-93-4), such as Nyprint 863.

The vegetable oil or hydrocarbon solvent preferably has a sulfur content at or below 1000 ppm. Generally, it is preferred that the vegetable oil or hydrocarbon solvent has a sulfur content at or below 750 ppm, and more preferably below 500 ppm. For example, the sulfur content is at or about 1 ppm, 10 ppm, 25 ppm, 50 ppm, 75 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm or 475 ppm, but less than 500 ppm sulfur. Exemplary continuous phase solvents that can be used to synthesize the shell polymers provided herein are hydrotreated light naphthenic distillates, e.g., Nytex 5130, and white mineral oils, e.g., Magie N-40 oil.

The solvent may also include at least one water-insoluble triglyceride with saturated monocarboxylic acid moieties, preferably comprising from 5 to 22 carbon atoms, such when the inks are formulated for sheet fed offset lithographic printing. The corresponding monocarboxylic acids are aliphatic and have only one carboxylic acid group which forms an ester group with glycerol. The three acid residues bound via ester groups to the glycerol can be the same or different. Examples of aliphatic monocarboxylic acids include valeric acid (5 carbon atoms), caproic acid (6 carbon atoms), oenanthic acid (7 carbon atoms), caprylic acid (8 carbon atoms), pelargonic acid (9 carbon atoms), capric acid (10 carbon atoms), lauric acid (12 carbon atoms), myristic acid (14 carbon atoms), palmitic acid (16 carbon atoms), stearic acid (18 carbon atoms), arachidic acid (20 carbon atoms) and behenic acid (22 carbon atoms).

The triglyceride may be a so called MCT (medium chained triglyceride). The saturated monocarboxylic acid moieties may each have independently 8 to 10 carbon atoms and preferably 8 and/or 10 carbon atoms. In the latter and preferred case, the inks or varnishes according to the present invention comprise solvents that comprise at least one of the following compounds: 2,3-bis(octanyloxy)propyl octanoate, 2,3-bis(octanyloxy)propyl decanoate, 2-(decanyloxy)-3-(octanyloxy)propyl octanoate, 2-(decanyloxy)-3-(octanyloxy)propyl decanoate, 3-(decanyloxy)-2-(octanyloxy)propyl decanoate, and 2,3-bis(decanyloxy)propyl decanoate.

Commercial examples for triglycerides or mixtures thereof that can be used in the present invention are Crodamol® GTCC by Croda, Witafrol®7420 by Huls AG, Myritol®312 by Cognis, Rotefan® GTCC by Ecogreen Oleochemicals and Raidiamuls®2106 by Oleon.

The drying reaction traditionally is accelerated further by addition of drying catalysts (metal driers), which are typically fatty acid salts, such as salts of organic carboxylic acids, of heavy metals such as cobalt and manganese, e.g., cobalt/manganese linoleate, hexadeconate or octoate Examples of curing with an actinic light source, such as for example electron beam energy, UV-light that may be provided by a high-voltage mercury bulb, a medium-voltage mercury bulb, a xenon bulb, a carbon arc lamp, a metal halide bulb, a UV-LED lamp, a UV laser, such as a semiconductor laser or an excimer laser, or sunlight. The curing occurs primarily through unsaturated groups via added mono-, di-, tri- or higher-functionality referred to as energy cure monomers.

Examples of such monomers include monofunctional ethylenically unsaturated monomers, including but not limited to the following monomers and combinations thereof, where the terms "ethoxylated" refers to chain extended compounds through the use of ethylene oxide, "propoxylated" refers to chain extended compounds through the use of propylene oxide, and "alkoxylated" refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts:

isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; isostearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; and 4-hydroxy butyl acrylate Examples of suitable multifunctional ethylenically unsaturated monomers that can be used in ink and coating compositions include but are not limited to the following multifunctional compounds (and combinations thereof), where the terms "ethoxylated" refers to chain extended compounds through the use of ethylene oxide, "propoxylated" refers to chain extended compounds through the use of propylene oxide, and "alkoxylated" refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts:

1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaacrylate; ethoxylated dipentaerythritol hexaacrylate.

Other functional monomer classes capable of being used in part in these formulations include cyclic lactam such as N-vinyl caprolactam; N-vinyl oxazolidinone and N-vinyl pyrrolidone, and secondary or tertiary acrylamides such as acryloyl morpholine; diacetone acrylamide; N-methyl acrylamide; N-ethyl acrylamide; N-isopropyl acrylamide; N-t.butyl acrylamide; N-hexyl acrylamide; N-cyclohexyl acrylamide; N-octyl acrylamide; N-t.octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethyl amino hexyl acrylamide; and N,N'-methylenebisacrylamide.

UV curable inks and coatings typically contain photoinitiators, such as for example benzophenones, benzilketales, dialkoxy acetophenones, hydroxyalkyl-acetophenones, aminoalkylphenones, acylphosphinoxides and thioxanthones, for example benzophenone, methylbenzophenone, 4-phenylbenzophenone, 4,4'-bis(dimethylamino)-benzophenone, 4,4'-bis(diethylamino)-benzophenone, 2,2-dimethoxy-2-phenyl acetophenone, dimethoxyacetophenone, diethoxyacetophenone, 2-hydroxy-2-methyl-1-phenylpropan-1-one, 2-benzyl-2-dimethylamino-1-(4-morpholinophenyl)-butan-1-one, 2-methyl-1-[4(methoxythio)-phenyl]-2-morpholinopropan-2-one, diphenylacylphenyl phosphinoxide, diphenyl (2,4,6-trimethylbenzoyl) phosphinoxide, 2,4,6-trimethylbenzoylethoxyphenyl phosphinoxide, 2-isopropylthioxanthone, 4-isopropylthioxanthone, 2,4-dimethylthioxanthone or mixtures thereof. Electron beam curable inks and coatings do not require photoinitators.

The ink and coating compositions may further contain the additives that modify flow, adjust surface tension, control gloss, control pigment wetting, and adjust abrasion resistance of the cured coating or printed ink. These are just a few of the additive types that may be included in the composition. Such additives include surface active agents, waxes, shelf-life stabilizers, and combinations thereof.

Additives may function as leveling agents, shelf-life stabilizers, wetting agents, slip agents, flow agents, dispersants and de-aerators. Preferred additives include fluorocarbon surfactants, silicones and organic polymer surfactants. Examples include the Tegorad® product line, commercially available from Tego Chemie, Essen, Germany, and the Solsperse® product line, commercially available from the Lubrizol Company).

The ink and coating compositions may further contain the extenders such as clay, talc, calcium carbonate, magnesium carbonate or silica to adjust water uptake, misting and color strength.

Inks and coatings can be applied using a variety of printing methods, including but not limited to lithography, flexography, gravure, screen and digital printing.

The ink and coating compositions may have a viscosity of between about 4 Pa-sec to about 20 Pa-sec, preferably between 5 Pa-sec to about 10 Pa-sec at a shear rate of 2500 l/s at 25° C., with flow values (yield values) of between about 40 Pa-sec to about 200 Pa-sec at a shear rate of 2.5 l/s at 25° C., and a tack of between about 5 tack units (g-meters) to about 20 tack units (g-meters) at 1200 rpm and 90° F. on a Thwing-Albert Inkometer, and preferably between 5 tack units (g-meters) to about 10 tack units (g-meters) at these same conditions.

In another inventive aspect, described are articles and the methods of forming same in which an article such as a substrate layer is coated with an ink or coating composition that includes the modified polystyrenes described herein. The ink and coating compositions or inks are may be applied to the articles by printing methods such as inkjet, flexo, gravure, screen, and lithographic printing. After application to the articles, drying or curing takes place.

The articles may be composed of any typical substrate such as paper, polymer, plastic, metals and composites. The substrate may be paper print stock such as that used for publications or may be a packaging material in the form of a cardboard sheet or corrugated board. Suitable polymer and plastic materials that can be used as a substrate include polyolefin, (e.g., polyethylene, polypropylene), polyester (e.g., polyethylene terephthalate). A metallized material may be used as a substrate, such as a metalized foil (e.g., a laminated aluminum foil) or metalized polyester.

The invention is further described by the examples given below.

EXAMPLES

The following examples illustrate specific aspects of the present invention and are not intended to limit the scope thereof in any respect and should not be so construed.

Testing Methods and Definitions

Method of Determining the Molecular Weight:

The molecular weights and polydispersity values were measured via Gel Permeation Chromatography (GPC) in a suitable solvent using a Waters 515 HPLC Pump equipped with a Waters 2410 refractive index detector or equivalent with Waters Millennium chromatography software, version 3.0, or equivalent with a Phenogel GPC 5 column set 300×7.8 mm OD, 5µ particle size and pore sizes of 50 Å, 100 Å, 500 Å, 10$^3$ Å and 10$^4$ Å. As used herein, "polydispersity" or "dispersity" is the measure of the broadness of a molecular weight distribution of a polymer. It is calculated as Mw/Mn, wherein Mw is the weight average molecular weight of the polymer, and Mn is the number average molecular weight of the polymer. A polymer having a polydispersity index of 1 means that all the chain lengths in the polymer are equal.

Method of Determining UV-Cure:

The extent of UV-cure is assessed by a thumb twist test and a solvent resistance test with isopropanol (IPA) and/or methyl ethyl ketone (MEK). Such a test is well known in the art and is, for example, described on page 74 of Test Methods for UV and EB Curable Systems, C. Lowe & P. K. T Oldring, SITA Technology, 1994, ISBN 0 947798 07 2. Coatings were cured at 150 fpm with a 200 watt/inch UV lamp.

Method of Determining Viscosity and Yield Stress:

The viscosity was determined with a falling rod Laray viscometer. Sample size (e.g., ink, coating composition) is about 2 grams to about 3.5 grams. Test is conducted at 25° C.±1°. Viscosity is dynamic viscosity in poise at a shear rate of 2500 reciprocal sections (sec$^{-1}$). Yield stress is dynamic viscosity in poise at a shear rate of 2.5 reciprocal seconds. ASTM D 4040 may be used to determine these values.

Method of Determining Tack:

Tack was measured with a calibrated Electronic Inkometer (Thwing-Albert Instrument Co.). Inks or coatings, as described are metered to one milliliter of fluid drawn up into a syringe. The fluid is placed onto the top rubber roller of the inkometer. The inkometer is turned 'on' to start the rollers rotating and the tack value reported is the maximum value reached after one minute of operation. The inkometer is operating at 90° F. and 1200 rpm.

Method of Determining Misting:

Misting is assessed at different places on a printing press, usually near an ink duct and a printing plate. Here, paper that catches the mist is mounted to the back plate of the inkometer. A white piece of paper is placed in a defined distance from the ink rollers and the press is run for a defined period of time at a defined speed and temperature. Then, the ink mist which is transferred to the paper is assessed by visual comparison to a master example or by measurement with a densitometer. Very little ink on the paper means that the ink has very low misting and low tendency to contaminate the printing press and press room with ink mist.

Visual assessment of misting is assigned a numerical grade: 1 represents no misting (ink mist is undetectable or minimal); 3 represent acceptable misting (small amount of ink mist is deposited on the paper) and 5 represents severe misting (large amount of ink mist is deposited on the paper).

Method of Determining Dry Transfer

Dry transfer refers to the amount of ink used to target a 1.10 print density, as measured on a densitometer. A Prüfbau printability tester can be used for this test. Ink is applied to rollers set to about 25° C. with a graduated pipette. Heat set dryer is set to 395° C. Roller pressure is set to 700 N. Printing unit speed is 3 meters/second. Printing is conducted on a substrate. Dry transfer to attain the stated print density is given in cubic millimeters ($mm^3$).

Method of Determining Water Pick Up

Water pick up provides information on the lithographic performance of finished inks on a printing press. Water pick up is determined on a Duke Ink Water Emulsification tester. The test is conducted on an ink or coating sample of a specified amount (e.g., 50 grams±0.1 grams, with or without additional water or fountain solution (e.g., 50 mL±0.5 mL)). Water pick up is given as percentage of water (and possibly fountain solution) that is decanted after conducting the test, relative to the total amount of water/fountain solution present before conducting the test. Water pick up may be assessed at different time intervals. The fountain solution used in the test is Rycoline PrintEasy® 2050 at 5.5 ounces per gallon of water (4.3%—w/v basis).

Method of Determining Printed Optical Density:

This is the achieved optical density of the prints with a densitometer.

Method of Determining Gloss:

Coating was applied using a #3 Mayer rod or 2-roll 14 bcm anilox hand proofer onto an uncoated BYK Leneta paper or coated BYK Chart PA-2810. Gloss is measured with a gloss meter at 60° angle.

Example 1: Depolymerization and Reaction with Acrylic Monomers

A 1000 ml four-neck flask with a mechanical stirrer, a reflux-condenser, a thermometer, a nitrogen inlet, and a dropping-funnel was charged with 153.1 g of Magie N40 (solvent) and 199.6 grams polystyrene (Aldrich Mw192000). The flask was heated with stirring to 190° C. using a mantle heater. 27.27 g styrene, 20.63 g lauryl methacrylate, 1.08 g of n-butyl methacrylate, and 1.03 g of acrylic acid were added drop-wise by funnel with 12.47 g of Magie N40 and 12.47 g of Luperox DI (initiator) over 2 hours. After holding the flask for 2 hours at 150° C., 13.24 g of Magie N40 and 13.24 g of Luperox DI were added in a minute. After holding the flask for 2 hours at 150° C., 45.94 g of Magie N40 was added in a minute and then resin was discharged.

Example 1 demonstrates that the depolymerization and modification reaction with monomers, in which a reaction occurs at the radical sites of the depolymerized polystyrene between same and the monomers can take place in a one step process.

TABLE 1

| Example 1 Properties | | | |
|---|---|---|---|
| | Mn | Mw | PD |
| Example 1 (inventive) | 25600 | 50000 | 2.0 |

This average molecular weight is much lower than typical industrial polystyrene, whether linear, expanded, extruded or oriented, are typically over 100,000 Daltons.

Coating 1, having the composition set forth in Table 2, was prepared as follows. All amounts set forth are in percentage by weight (wt %). 33.97 wt % of the resin produced in Example 1, 1.02 wt % of a blend that is 95 wt % 1,6-HDDA and Phenothiazine, 15.05 wt % HDDA, 33.99 wt % TPGDA, and 15.97 wt % TMPTA, are heated for 50 minutes at 125° C., then cooled. A clear solution is present at room temperature. Then a blend of 10.18 wt % Benzophenone photoinitiator, 5.19% Omnirad 481 (Hydroxycyclohexyl Phenylketone, photoinitiator, 19.86 wt % Ebecryl P115 synergist, (an aminoacrylate that is used to synergize the free radical generation of Type II photoinitiators such as benzophenone), 2.89 wt % TegoRad 2300 (flow aid), 1.10 wt % Airex 920 (defoamer), 10.98 wt % TPGDA, and 49.80 wt % TMPTA are mixed to form a clear solution at room temperature. The two parts are combined at room temperature.

TABLE 2

| Components of Coating 1 | |
|---|---|
| Coating 1 | Wt % |
| Example 1 | 16.99 |
| Di functional acrylate monomer A 1,6-hexanediol diacrylate | 8.03 |
| Di functional acrylate monomer B tripropyleneglycol | 22.51 |
| Tri functional acrylate monomer A trimethylolpropane | 32.90 |
| Phenothiazine inhibitor | 0.05 |
| Omnirad 481 Photoinitiator | 2.59 |
| Benzophenone Photoinitiator | 5.08 |
| Ebecryl P115 as synergist | 9.91 |
| Flow Aid (Tego Rad 2300) | 1.44 |
| Defoamer (Airex 920) | 0.55 |
| Total | 100.00 |

Coating 1 and a commercially available coating identified in Table 3 below were applied to a paper material (BYK Chart 2810), test form. The coating was manually applied with #3 Mayer rod, and cured with medium pressure Hg vapor UV lamp at 200 feet/min and 200 Watts/inch (61 m/min and 80 W/cm).

TABLE 3

Coating 1 Properties Compared to Commercial Coating Used in Packaging

| #3 Mayer Rod | Sun Chemical Commercial Coating RCSFV0343453 | Coating 1 |
|---|---|---|
| 60° gloss over black | 87.7 | 87.4 |
| 60° gloss over white | 89.6 | 90.2 |
| MEK Rubs | 100 | 110 |

The commercial coating RCSFV0343453 is based on an epoxy oligomer that includes bisphenol A (BPA). The inclusion of BPA in consumer products such as water bottles and food containers has been question due to health concerns posed by this material. Table 3 includes information showing that with the coating including Example 1, it is possible to achieve the same properties in a BPA free coating. Coating 1 of the present invention exhibits comparable gloss and resistance to removal to a commercial coating using bisphenol A.

Example 2: Grafting Reaction Between Polystyrene and Acrylic Polymers (a) Preparation of acrylic polymers: A 1 L four-neck flask equipped with a mechanical stirrer, a reflux-condenser, a thermometer, a nitrogen inlet, and a dropping-funnel was charged with 104.1 g of Magie N40. The flask was heated with stirring to 125° C. using a mantle heater. 136.4 g of styrene, 103.2 g of lauryl methacrylate, 5.2 g of n-butyl methacrylate, and 5.2 g of acrylic acid were added drop-wise by funnel with 40.0 g of Magie N40 and 1.2 g of Luperox P over 4 hours. After holding the flask for 2 hours at 125° C., 3.4 g of Magie N40 and 0.7 g of Luperox P were added in a minute. After holding the flask for 3 hours at 125° C., 100.6 g of Magie N40 was added in a minute and then resin was discharged at 90° C.

(b) A 250 mL four-neck flask equipped with a mechanical stirrer, a reflux-condenser, a thermometer, a nitrogen inlet, and a dropping-funnel was charged with 20.0 g of polystyrene (Mw is 250,000 from ACROS) and 40.0 g of Example 2 (a). The flask was heated with stirring to 170° C. using a mantle heater. After melting and homogenizing the mixture, the flask was cooled down to 150° C. and then 18.4 g of Magie N40 and 1.6 g of Luperox DI were added drop-wise by funnel over 2 hours. After holding the flask for 3 hours of 150° C., resin was discharged at 140° C. into a glass jar.

TABLE 4

| | Properties | | |
|---|---|---|---|
| | Mn | Mw | PD |
| Example 2 (Inventive) | 42,400 | 138,400 | 3.27 |

Example 3: Grafting Reaction Between Polystyrene and Acrylic Monomers

A 250 mL four-neck flask equipped with a mechanical stirrer, a reflux-condenser, a thermometer, a nitrogen inlet, and a dropping-funnel was charged with 199.68 g of polystyrene (Mw is 250,000 from ACROS) and 153.24 g of Magie N40. The flask was heated with stirring to 170° C. using a mantle heater. After melting and homogenizing the mixture, the flask was cooled down to 150° C. and then 27.27 g of styrene, 20.60 g of lauryl methacrylate, 1.07 g of n-butyl methacrylate, and 1.03 g of acrylic acid were added drop-wise by funnel with 24.94 g of Magie N40 and 25.01 g of Luperox DI over 2 hours. After holding the flask for 1.5 hours at 150° C., 0.76 g of Magie N40 and 0.8 g of Luperox DI were added in a minute. After holding the flask for 3.5 hours at 150° C., 12.0 g of Magie N40 was added in a minute and then resin was discharged at 140° C. on an aluminum sheet.

TABLE 5

| | Properties | | |
|---|---|---|---|
| | Mn | Mw | PD |
| Example 3 (Inventive) | 28,800 | 58,500 | 2.02 |

TABLE 6

Finished Ink Properties

| Ink Formulation | Example 2 Heat set Ink | Example 3 Heat set Ink |
|---|---|---|
| A-Cyan HS Flush FDRH022 (Sun Chemical) | 39.0 | 39.0 |
| B1-Example 2 | 12.0 | 0 |
| B2-Example 3 | 0 | 12.0 |
| C-Varnish18-V-730 | 14.0 | 14.0 |
| D-Clay 10-K-60 | 17.7 | 17.7 |
| E-Magie oil 500 | 3.3 | 3.3 |
| F-Isopropyl palmitate | 3.0 | 3.0 |
| I- Tap water | 11.0 | 11.0 |
| Total | 100.0 | 100.0 |

C-phenolic modified rosin ester in Magie 500 and MagieN40.
D-Kaolin clay in soy oil Using a mixer at 3000 rpm, combine A & B; mix for 2 minutes; add C and mix for 5 minutes; add D and mix for 2 minutes; add E and mix for 30 seconds; add F and mix for 30 seconds then add I and mix for 5 minutes.

Table 7 reports the properties of the ink of Example 3 and a commercially available ink that dry by evaporation of solvent. Higher viscosity is preferred and higher yield stress is preferred (particularly at lower tack). The ink of Example 3 exhibits lower tack, viscosity and yield yet surprisingly was equal in misting, demonstrating that this could be an ink composition with superior printing properties, particularly on low basis weight paper, which tends to pick and lint at high viscosity, tack and yield.

TABLE 7

| | Properties | |
|---|---|---|
| Property | Sun Chemical Commercial OM Cyan Heatset Ink | Example 3 Ink |
| Tack (1 minute) | 4.8 | 3.1 |
| Visc. @2500 s−1 (poise) | 60 | 42 |
| Yield stress @2.5 s$^{-1}$ | 1450 | 730 |
| Misting | 3 | 3 |
| Dry transfer Ink for 1.1 density (cubic mm) | 160 | 220 |

OM—"Optimum Mileage" Ink

TABLE 7A

Water Pickup Rycoline 2050

| Time (Minutes) | Sun Chemical Commercial OM Cyan Heatset Ink | Example 3 Ink |
| --- | --- | --- |
| 5 | 42% | 44% |
| 10 | 56% | 58% |
| 15 | 62% | 62% |

Example 4: Depolymerization

A 1000 ml flask was filled with 500.00 g of polystyrene (Chemical Resources, Mn 41,300; Mw 112,000), 500.00 of toluene. The reaction was heated to 100° C. A mixture of 26.6 g of Luperox 26M50 (Arkema) and 25.0 g of toluene (Sigma) were added drop wise over 3 hours. The reaction was run for 1 hour, stopped, and the resin was discharged on an aluminum sheet and allowed to air dry. A clear, light grey solid was obtained. A 250 ml flask was filled with 85 g TPGDA (Miwon), 15.0 g of the resin and 0.50 g 4-methoxyphenol (MEHQ, Sigma) and heated to 115° C. for 3 hours and filtered to obtain a single phase system. The inventive depolymerized polystyrene product was made into a stable 15 wt % solids coating solution in TPGDA and is coating 4 in Table 11 below. In contrast, is the source polystyrene resin can be made into a coating solution that includes only a 4 wt % of the resin in a solution of TPGDA.

TABLE 8

Properties

| | Mn | Mw | PD |
| --- | --- | --- | --- |
| Example 4 (Inventive) | 32,800 | 95,200 | 2.9 |

Example 5: Depolymerization and Grafting with Acrylic Monomer

A 500 ml flask was filled with 50.00 g of polystyrene (Chemical Resources, Mn 41,300; Mw 112,000) and 60.00 g of toluene. The reaction was blanketed with nitrogen and heated to 100° C. 2.6 g of Luperox 26M50 (Arkema) and 10.0 g of toluene (Sigma) were added drop wise over 6 minutes. Then, 1.1 g acrylic acid (Acros), 2.66 g Luperox 26M50 and 10 g toluene was added over 9 minutes. The reaction was run for 3 hours and then 1.65 g MEHQ in 25 ml toluene added over 10 minutes. 283.30 g tripropylene glycol diacrylate was added over 9 minutes and the temperature increased to 116° C. to strip off the toluene.

TABLE 9

Properties

| | Mn | Mw | PD |
| --- | --- | --- | --- |
| Example 5 (Inventive) | 47,500 | 124,700 | 2.65 |

TABLE 10

Coating 5 Formulation

| | Coating 5 |
| --- | --- |
| Example 5 | 55.37 |
| Di functional acrylate monomer HDDA | 10.51 |
| Tri functional acrylate monomer TMPTA | 14.97 |
| Omnirad 481 Photoinitiator | 2.81 |
| Benzophenone Photoinitiator | 5.59 |
| Ebecryl P115 Photoinitiator | 10.2 |
| Flow Aid (Tegorad 230) | 0.5 |
| Defoamer (Airex 92) | 0.05 |
| Total | 100.00 |

TABLE 11

Coating 4 & 5 Properties vs. Commercial Coating

| Proofed with 4.2 bcm anilox | Sun Chemical Commercial UV Coating RC88-1170 | Coating 4 | Coating 5 |
| --- | --- | --- | --- |
| 60° gloss over white | 90.2 | 88.53 | 90.45 |
| MEK Rubs | 140 | 500+ | 500+ |

As shown in Table 11, Coatings 4 and 5 exhibit superior solvent resistance, showing resistance to more than 500+ MEK rubs, a much superior result when compared to a commercial coating.

Example 6: Grafting by Corona Discharge (Prophetic Example)

Polystyrene pellets are exposed with a 15 kV voltage at 60 Hz corona discharge treatment in air thereby introducing peroxides onto the surface. The polystyrene is subsequently copolymerized with acrylic monomers (i.e. 2-hydroxyethyl methacrylate) in solvent. The resultant polystyrene has improved hydrophilicity with concentrations of hydroxyl and ester groups dependent on the time of treatment. One skilled in the art can then formulate waterbased inks and coatings containing the more hydrophilic polystyrene copolymer as it would be compatible with typical waterbased acrylic resins based on styrenated acrylics.

Example 7: Electron Beam Irradiation and In-Situ Grafting with Monomer 100 grams of Polystyrene beads were sealed with air in a polyethylene bag. The electron beam irradiation was done at room temperature (25° C.) at 200 ppm oxygen outside the bag. The energy of the electron beam was 8 MeV at a beam current 20 mA. The distance from the output beam source to the sample was 30 cm. The accelerator produced a stable beam of the same energy and the samples were irradiated at different doses by irradiating for different time durations. Care was taken that the sample temperature was not very much different from room temperature. In situ grafting of polyethylene glycol (PEG 1000) and (methylvinyl ether/maleic anhydride), VEMA H or VEMA AN (Ashland) at various ratios of PEG to VEMA resulted in a series of grafted polystyrene with compatibility in inks and coatings.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An ink or coating composition comprising a depolymerized polystyrene resin deriving from a source polystyrene resin, the depolymerized polystyrene resin having a number average molecular weight equal to or greater than 5,000 Dalton, and further comprising one or more of an energy-curable component.

2. The ink or coating composition of claim 1, wherein the ink does not include a colorant.

3. The depolymerized polystyrene resin of claim 1, wherein the number average molecular weight of the depolymerized polystyrene resin is about 10,000 Daltons or greater.

4. The depolymerized polystyrene resin of claim 1, wherein the depolymerized polystyrene resin comprises terminal ends that are vinylic, saturated, or oxy substituted.

5. The depolymerized polystyrene resin of claim 1, wherein the depolymerized polystyrene resin is modified with a monomer, oligomer or polymer including styrene or polystyrene.

6. The ink or coating composition of claim 1, wherein the energy curable component comprises acrylated oligomers, acrylic monomers, and combinations thereof.

7. The ink or coating composition of claim 1, wherein the ink or coating composition is curable upon exposure to energy from an electron beam source.

8. The ink or coating composition of claim 1, further comprising a photoinitiator.

9. The ink or coating composition of claim 1, wherein the ink is suited for printing methods selected from flexographic, gravure, screen, offset, lithography, heatset, and sheetfed.

10. An ink or coating composition comprising a depolymerized polystyrene resin deriving from a source polystyrene resin and a solvent, the depolymerized polystyrene resin having a number average molecular weight equal to or greater than 5,000 Dalton.

11. The ink or coating composition of claim 10, wherein the ink is suited for printing methods selected from flexographic, gravure, screen, offset, lithography, heatset, and sheetfed.

12. The ink or coating composition of claim 10, wherein the solvent is a fast solvent selected from methanol, ethanol, propanol, iso-propanol, acetone, methyl ethyl ketone, methyl isobutyl ketone, pentane, hexane, heptane, methyl acetate, ethyl acetate, propyl acetate, derivatives thereof, and mixtures thereof.

13. The ink or coating composition of claim 10, wherein the solvent is an intermediate solvent selected from C4-8 alcohols, 1-methoxy-2-propanol, 2-methoxy ethanol, 2-ethoxy ethanol, 1-methoxy-2-acetoxy propane, derivatives thereof, and mixtures thereof.

14. The ink or coating composition of claim 10, wherein the solvent is a slow solvent selected from tripropylene glycol monomethyl ether, tripropylene glycol-n-butyl ether, propylene glycol phenyl ether, derivatives thereof, and mixtures thereof.

15. The ink or coating composition of claim 10, wherein the solvent is a higher boiling solvent selected from petroleum distillates, hydrocarbons, fatty acid methyl esters, and mixtures thereof.

16. The ink or coating composition of claim 10, wherein the solvent is selected from aliphatic hydrocarbons, cyclic hydrocarbons, aromatic hydrocarbons, ketones, aldehydes, alcohols, ethers, esters, and mixtures thereof.

17. The ink or coating composition of claim 10, wherein the solvent is selected from linseed oil, tung oil or castor oil, dehydrated castor oil, fatty acid esters, petroleum distillates, mineral oils; fatty acid esters of methyl, ethyl, butyl and 2-ethylhexyl esters of tall oil fatty acids, coconut fatty acids, linseed oil fatty acids, soya oil fatty acids, palm oil fatty acids and rapeseed oil fatty acids; diethylene glycol esters of tall oil fatty acid; methyl esters of lauric acid, myristic acid, palmitic acid and caprylic acid; methyl, butyl, 2-ethylhexyl and isobutyl esters of oleic acid; oleic acid esters of diethylene and triethylene glycol; dibutyl adipates and sebacates; di-2-ethylhexyl adipates and sebacates; almond oil, cacao oil, candlenut oil, corn oil, cottonseed oil, grapeseed oil, hempseed oil, olive oil, peanut oil, rice bran oil, safflower oil, sunflower oil, sesame oil, soybean oil, walnut oil, the fatty acid esters thereof, the fatty acid alkyl esters thereof; ethyl hexyl palmitate; hydrocarbon solvents including paraffinic oils, white mineral oils, Magie N-40 oil; naphthenic oils and distillates, hydrotreated light naphthenic distillates (CAS No. 64742-53-6), Nytex 5130, hydrotreated heavy naphthenic distillates (CAS No. 64742-52-5), Nytex 510 and Nytex 810; aromatic oils; a water-insoluble triglyceride with saturated monocarboxylic acid moieties of 5 to 22 carbon atoms; and combinations thereof.

18. The ink or coating composition of claim 10, further comprising a colorant.

19. The depolymerized polystyrene resin of claim 10, wherein the number average molecular weight of the depolymerized polystyrene resin is about 10,000 Daltons or greater.

20. The depolymerized polystyrene resin of claim 10, wherein the depolymerized polystyrene resin comprises terminal ends that are vinylic, saturated, or oxy substituted.

21. The depolymerized polystyrene resin of claim 10, wherein the depolymerized polystyrene resin is modified with a monomer, oligomer or polymer including styrene or polystyrene.

* * * * *